United States Patent
Watanabe

(10) Patent No.: US 11,991,323 B2
(45) Date of Patent: May 21, 2024

(54) IMAGE FORMING APPARATUS AND CONTROL METHOD WITH POWER SAVING MODES

(71) Applicant: TOSHIBA TEC KABUSHIKI KAISHA, Tokyo (JP)

(72) Inventor: Yasuhiko Watanabe, Chigasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/893,708

(22) Filed: Aug. 23, 2022

(65) Prior Publication Data
US 2023/0068473 A1 Mar. 2, 2023

(30) Foreign Application Priority Data
Sep. 1, 2021 (JP) ................. 2021-142623

(51) Int. Cl.
*H04N 1/00* (2006.01)
*G03G 15/00* (2006.01)

(52) U.S. Cl.
CPC ..... *H04N 1/00567* (2013.01); *G03G 15/5004* (2013.01); *G03G 2215/00725* (2013.01)

(58) Field of Classification Search
None
See application file for complete search history.

(56) References Cited

U.S. PATENT DOCUMENTS

| 2013/0057894 A1* | 3/2013 | Narushima | H04N 1/00323 358/1.14 |
| 2014/0153013 A1* | 6/2014 | Imamura | G03G 15/6552 358/1.12 |

* cited by examiner

*Primary Examiner* — Andrew H Lam
(74) *Attorney, Agent, or Firm* — FOLEY & LARDNER LLP

(57) ABSTRACT

According to at least one embodiment, an image forming apparatus includes a first sensor, a second sensor, and a controller. The first sensor is configured to detect a user. The second sensor is configured to detect a sheet in a sheet holder. The controller is configured to change a transition mode of an operation mode based on a first detection result of the sheet in the sheet holder by the second sensor in response to the detection of the user by the first sensor when the operation mode of the image forming apparatus is a second power-saving mode, which consumes less power than a first power-saving mode.

16 Claims, 4 Drawing Sheets

IMAGE FORMING APPARATUS AND CONTROL METHOD WITH POWER SAVING MODES

CROSS-REFERENCE TO RELATED APPLICATION

This application is based upon and claims the benefit of priority from Japanese Patent Application No. 2021-142623, filed on Sep. 1, 2021, the entire contents of which are incorporated herein by reference.

FIELD

Embodiments described herein relate generally to an image forming apparatus and a control method.

BACKGROUND

There is an image forming apparatus equipped with a motion sensor for detecting whether or not a user is near the image forming apparatus.

In an image forming apparatus equipped with a motion sensor, there is known a technique for switching between a normal mode and a power-saving mode for an operation mode of the image forming apparatus based on the detection of a user by the motion sensor to save power.

DETAILED DESCRIPTION

Figure 1:
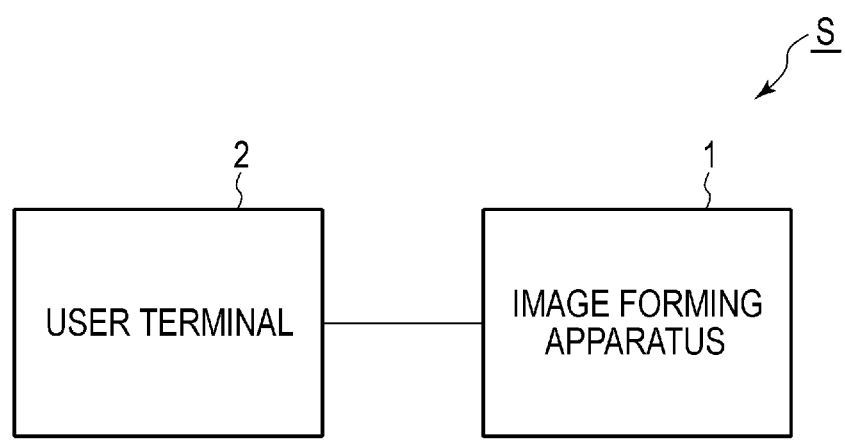
FIG. 1 is a block diagram illustrating an outline of a system including an image forming apparatus according to at least one embodiment.

In image forming apparatuses such as those described above, however, even if the motion sensor detects that a user is near the image forming apparatus, such image forming apparatuses do not have to be always operated. For example, the motion sensor detects a user even if the user comes to such image forming apparatuses to pick up the printed matter, but in such a case, it is not necessary to switch the operation mode of the image forming apparatuses for restoration. If the operation mode is switched even if the user does not operate such image forming apparatuses, the power consumption may increase due to the unnecessary switching of the operation mode.

Embodiments of the present disclosure provide a technique capable of reducing an increase in power consumption due to the switching of the operation mode.

In general, according to at least one embodiment, the image forming apparatus includes a first sensor, a second sensor, and a control unit (e.g., controller). The first sensor detects a user. The second sensor detects a printed matter (e.g., sheet) in a sheet discharge unit (e.g., sheet holder). The control unit changes a transition mode of an operation mode based on the detection result of the printed matter in the sheet discharge unit by the second sensor in response to the detection of the user by the first sensor if the operation mode of the image forming apparatus is a second power-saving mode which consumes less power than a first power-saving mode.

Hereinafter, embodiments will be described with reference to the drawings. In each drawing, the same components are designated by the same reference numerals as much as possible and duplicate descriptions will be omitted.

[System Configuration]

FIG. 1 is a block diagram showing an outline of a system S including an image forming apparatus 1 according to an embodiment.

The system S includes the image forming apparatus 1 and a user terminal 2. The image forming apparatus 1 and the user terminal 2 are communicably connected to each other by wire or wirelessly via a network. For example, the network is a Local Area Network (LAN).

The image forming apparatus 1 is an apparatus having an electrophotographic printing function. The image forming apparatus 1 will be described as being a digital multifunction peripheral (MFP) having a copy function, a print function, a facsimile function, a scanner function, and the like. A configuration example of the image forming apparatus 1 will be described later.

The user terminal 2 is an electronic device capable of processing information. For example, the user terminal 2 is, but is not limited to, a Personal Computer (PC), a tablet terminal, a smartphone, or the like. The user terminal 2 transmits the print data to the image forming apparatus 1. The print data is data of a job related to printing requested from the user terminal 2 to the image forming apparatus 1. The print data includes print settings input by the user on the user terminal 2. The print settings include various print-related settings such as color mode, sheet type, print mode, number of copies, and sheet size. The print data includes image data to be printed specified by the user on the user terminal 2. The print data includes user identification information.

[Apparatus Configuration]

Figure 2:
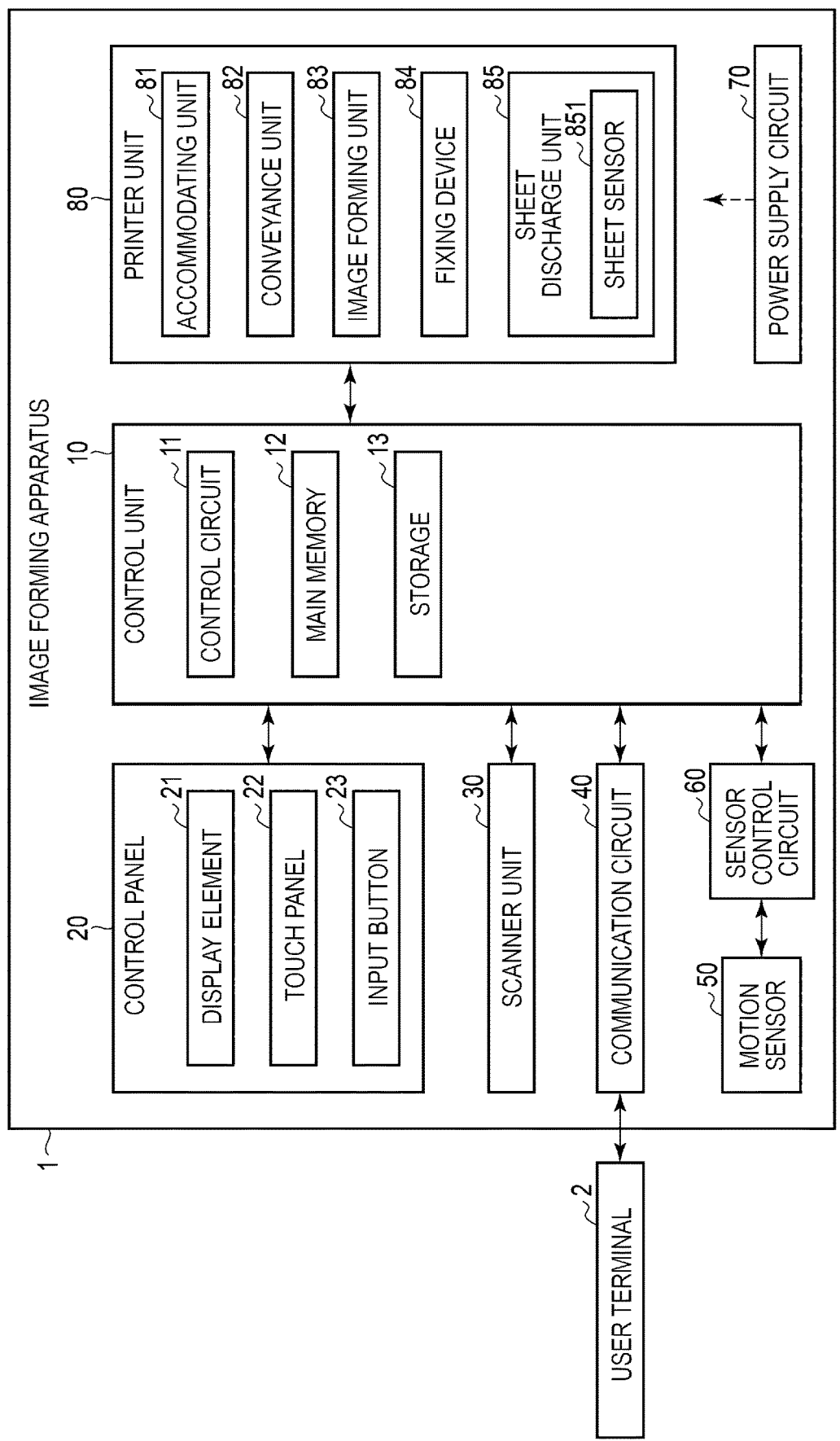
FIG. 2 is a block diagram showing an outline of a configuration example of the image forming apparatus.

FIG. 2 is a block diagram showing an outline of a configuration example of the image forming apparatus 1 according to the embodiment.

The image forming apparatus 1 includes a control unit 10, a control panel 20, a scanner unit 30, a communication circuit 40, a motion sensor 50, a sensor control circuit 60, a power supply circuit 70, and a printer unit 80.

The control unit 10 controls the operation of each part of the image forming apparatus 1. The control unit 10 includes a control circuit 11, a main memory 12, and a storage 13.

The control circuit 11 corresponds to a central part of the image forming apparatus 1. The control circuit 11 includes a processor such as a Central Processing Unit (CPU). The control circuit 11 may include an ASIC (Application Specific Integrated Circuit), a Field Programmable Gate Array (FPGA), a Graphics Processing Unit (GPU), or the like in addition to or in place of the CPU. The control circuit 11 loads the program stored in advance in the main memory 12 or the storage 13 into the main memory 12. The control circuit 11 executes various operations by executing a program loaded in the main memory 12. The control circuit 11 is an example of a control unit.

The control circuit 11 starts the control operation of the operation mode of the image forming apparatus 1 based on the power ON of the image forming apparatus 1. The control circuit 11 ends the control operation of the operation mode of the image forming apparatus 1 based on the power OFF of the image forming apparatus 1. The operation mode of the image forming apparatus 1 has at least a normal mode and a power-saving mode. The normal mode is a mode in which power is supplied to each element of the image forming apparatus 1. The normal mode includes the ready state and the printing state. The ready state is a state in which printing is ready. The printing state is a state during the printing process by the printer unit 80. Since the ready state is before the printing process, the power consumption in the ready state is lower than the power consumption in the printing state. The power-saving mode is a mode in which the power consumed by the image forming apparatus 1 is reduced as compared with the normal mode because fewer elements in the image forming apparatus 1 are supplied with power than in the normal mode. The power-saving mode includes a first power-saving mode and a second power-saving mode. The first power-saving mode is a mode that consumes less power than the normal mode. The second power-saving mode is a mode in which the power consumed by the image forming apparatus 1 is reduced than in the first power-saving mode. The second power-saving mode is a mode that consumes less power than the first power-saving mode because fewer elements in the image forming apparatus 1 are supplied with power than in the first power-saving mode. The control circuit 11 and the main memory 12 maintain power supply from the power supply circuit 70 in the normal mode, the first power-saving mode, and the second power-saving mode. The printer unit 80 maintains the power supply from the power supply circuit 70 in the normal mode, but the power supply from the power supply circuit 70 is stopped in the first power-saving mode and the second power-saving mode. A sheet sensor 851 maintains the power supply from the power supply circuit 70 in the normal mode, but the power supply from the power supply circuit 70 is stopped in the first power-saving mode and the second power-saving mode. The motion sensor 50 and the sensor control circuit 60 maintain power supply from the power supply circuit 70 in the normal mode, the first power-saving mode, and the second power-saving mode. The power supply may be read as an electric power supply.

The control circuit 11 stores the detection result in the main memory 12 in response to the acquisition of the detection signal from the sheet sensor 851. The detection signal indicates the presence or absence of the sheet in a sheet discharge unit 85. The sheet in the sheet discharge unit 85 is a sheet printed by the printer unit 80. The sheet in the sheet discharge unit 85 is an example of a printed matter. For example, the control circuit 11 sets a sheet flag in the main memory 12 based on the detection signal. The sheet flag is 1-bit information for identifying the presence or absence of the sheet in the sheet discharge unit 85. In the present embodiment, the sheet flag indicating the presence of the sheet is set to "1", and the sheet flag indicating the absence of the sheet is set to "0". The sheet flag is an example of a sheet detection result in the sheet discharge unit 85.

The control circuit 11 changes the transition mode of the operation mode of the image forming apparatus 1 based on the sheet flag in response to the detection of a user by the motion sensor 50. In one example, the control circuit 11 maintains the operation mode of the image forming apparatus 1 in the second power-saving mode based on the fact that the sheet flag is set to "1" in response to the detection of a user by the motion sensor 50. The fact that the sheet flag is set to "1" is an example of the detection result indicating the presence of a sheet. In this case, the control circuit 11 resets the sheet flag to "0".

In another example, the control circuit 11 shifts the operation mode of the image forming apparatus 1 from the second power-saving mode to the first power-saving mode based on the fact that the sheet flag is set to "0" in response to the detection of a user by the motion sensor 50. The fact that the sheet flag is set to "0" is an example of the detection result indicating the absence of a sheet.

The main memory 12 corresponds to the main storage part of the image forming apparatus 1. The main memory 12 includes a non-volatile memory area and a volatile memory area. The main memory 12 stores an operating system or a program in a non-volatile memory area. The main memory 12 uses the volatile memory area as a work area where data is appropriately rewritten by the control circuit 11. For example, the main memory 12 includes a Read Only Memory (ROM) as a non-volatile memory area. For example, the main memory 12 includes a Random Access Memory (RAM) as a volatile memory area.

The storage 13 corresponds to the auxiliary storage part of the image forming apparatus 1. For example, the storage 13 includes a Hard Disk Drive (HDD). The storage 13 may include a semiconductor storage medium such as a Solid State Drive (SSD) in addition to the HDD or instead of the HDD. The storage 13 stores the above-mentioned program, data used by the control circuit 11 for performing various processes, and data generated by the processes of the control circuit 11. The storage 13 may store print data.

The control panel 20 includes a display element 21, a touch panel 22, and an input button 23.

The display element 21 is a display element that displays an image. The display element 21 is, but is not limited to, a liquid crystal display, an organic electroluminescence (EL) display, or the like. The touch panel 22 is a device that forms a touch screen together with the display element 21 by stacking the touch panel 22 on the display element 21. The touch panel 22 detects the user's contact with the display element 21. The touch panel 22 is an example of an input interface for inputting a user's instruction. The input button 23 is a button that can be pressed, such as a print start button. The input button 23 is an example of an input interface for inputting a user's instruction.

The scanner unit 30 is a device that reads images such as characters, figures, and photographs drawn on a sheet placed at a predetermined position. The scanner unit 30 includes a line sensor. The line sensor may be a Charge Coupled Device (CCD) system. The line sensor may be a Contact Image Sensor (CIS) method. The scanner unit 30 generates image data based on an image read by using a line sensor. The scanner unit 30 transmits the generated image data to the control unit 10. The control unit 10 stores the received image data in the storage 13 or transmits the received image data to the printer unit 80.

The communication circuit 40 is an interface for communicating with an external device of the image forming apparatus 1. The communication circuit 40 connects communicably the image forming apparatus 1 and the user terminal 2 to each other via a network.

The motion sensor 50 is a sensor that detects a user approaching the image forming apparatus 1. For example, the motion sensor 50 is a passive sensor such as a pyroelectric infrared sensor but is not limited thereto. The motion sensor 50 may be an active sensor such as an ultrasonic sensor or an infrared sensor of a type that emits a laser.

The motion sensor 50 may be able to adjust the detection level to two or more stages. The detection level is a stage related to detection. The detection level includes at least one of a detection distance level, a detection sensitivity level, and a detection frequency level. The detection distance is a distance from the motion sensor 50 that the motion sensor 50 can detect a user. The detection sensitivity is an accuracy with which the motion sensor 50 detects a user within the detection distance. The detection frequency is a frequency at which the motion sensor 50 detects a user. If the motion sensor 50 is an active sensor, the detection frequency can be changed. As the detection level increases, at least one of the detection distance level, the detection sensitivity level, and the detection frequency level also increases. As the detection distance level increases, the detection distance increases. As the detection sensitivity level increases, the detection sensitivity increases. As the detection frequency level increases, the detection frequency increases. As the detection level increases, the power consumption of the motion sensor 50 increases. Lowering the detection level includes lowering the detection distance level. Lowering the detection distance level involves shortening the detection distance. Lowering the detection level includes decreasing the detection sensitivity level. Decreasing the detection sensitivity level includes lowering the detection sensitivity. Lowering the detection level includes decreasing the detection frequency level. Decreasing the detection frequency level includes reducing the detection frequency.

The motion sensor 50 may include a plurality of sensors having different detection levels. In this example, the motion sensor 50 may be a method of adjusting the detection level by switching a plurality of sensors. The motion sensor 50 may include one sensor. In this example, the motion sensor 50 may be a method of adjusting the detection level by mechanically or electrically adjusting one sensor.

The motion sensor 50 outputs a detection signal indicating whether or not the user was detected to the control circuit 11. The motion sensor 50 is an example of the first sensor.

The sensor control circuit 60 is a circuit that controls the motion sensor 50. The sensor control circuit 60 may be able to adjust the detection level.

The power supply circuit 70 converts AC power supplied from a commercial power source into DC power and supplies power to each part of the image forming apparatus 1. The power supply circuit 70 may be controlled by the control circuit 11.

The printer unit 80 is a unit that forms an image on a sheet. For example, the printer unit 80 forms an image on a sheet based on image data transmitted from the user terminal 2 via a network. Here, an example of the printer unit 80 using the tandem type toner image transfer unit will be described. The printer unit 80 includes an accommodating unit 81, a conveyance unit 82, an image forming unit 83, a fixing device 84, a sheet discharge unit 85, and a sheet sensor 851.

The accommodating unit 81 accommodates sheets. The accommodating unit 81 includes a sheet cassette and a pickup roller. The sheet cassette accommodates sheets. The pickup roller picks up the sheet one by one from the sheet cassette. The pickup roller supplies the picked-up sheet to the conveyance unit 82.

The conveyance unit 82 conveys the sheet in the printer unit 80. The conveyance unit 82 includes a plurality of rollers and a registration roller. The plurality of rollers include a roller that conveys the sheet supplied by the pickup roller to the registration roller. The plurality of rollers are provided on the downstream side of the fixing device 84, which will be described later, and include rollers that discharge the sheet to the sheet discharge unit. The registration roller conveys the sheet to the transfer unit according to the timing at which the transfer unit of the image forming unit 83, which will be described later, transfers the toner image to the sheet.

The image forming unit 83 forms a toner image on the sheet. The image forming unit 83 includes an intermediate transfer belt, a plurality of developing units, an exposure device, a transfer unit, and the like.

The intermediate transfer belt is an endless belt.

A plurality of developing units correspond to the number of types of toner. The plurality of developing units include a black developing unit, a cyan developing unit, a magenta developing unit, and a yellow developing unit. Each developing unit includes a photoconductor drum. Each developing unit includes a charger, a developing device, a primary transfer roller, a cleaning unit, and a static eliminator around the photoconductor drum. The photoconductor drum is a drum having a photoconductor layer on the surface. The charger uniformly charges the photoconductor layer on the surface of the photoconductor drum. The developing device develops an electrostatic latent image on the surface of the photoconductor drum with toner. The developing device forms a toner image on the surface of the photoconductor drum. The primary transfer roller faces the photoconductor drum and sandwiches the intermediate transfer belt. The primary transfer roller transfers the toner image on the surface of the photoconductor drum onto the intermediate transfer belt. The cleaning unit removes untransferred toner on the surface of the photoconductor drum. The static eliminator irradiates the surface of the photoconductor drum with light. The static eliminator removes static electricity from the photoconductor layer of the photoconductor drum by irradiation with light.

The exposure device irradiates the surface of the photoconductor drum of each developing unit with laser light via an optical system such as a polygon mirror. The exposure device forms an electrostatic pattern on the surface of the photoconductor drum as an electrostatic latent image.

The transfer unit transfers the charged toner image on the surface of the intermediate transfer belt to the sheet. The transfer unit includes a support roller and a secondary transfer roller configured to sandwich the intermediate transfer belt and the sheet from both sides in the thickness direction.

The fixing device 84 applies heat and pressure to the sheet on which the toner image supplied from the image forming unit 83 is formed. The fixing device 84 fixes the toner image formed on the sheet by heat and pressure.

The sheet discharge unit 85 may be an opening or a tray having a sheet receiving surface on which the sheet conveyed from the conveyance unit 82 is discharged.

The sheet sensor 851 is a sensor that detects the presence or absence of a sheet in the sheet discharge unit 85. The sheet sensor 851 is, for example, a non-contact type sensor. The non-contact type sensor is, for example, a sensor such as a reflective photosensor or a transmissive photosensor but is not limited thereto. The sheet sensor 851 may be a contact-type sensor. The contact-type sensor is, for example, a mechanical micro switch or the like but is not limited thereto. The sheet sensor 851 outputs a detection signal indicating the presence or absence of the sheet in the sheet discharge unit 85 to the control circuit 11. The sheet sensor 851 is an example of the second sensor.

[Transition of Operation Mode]

Figure 3:
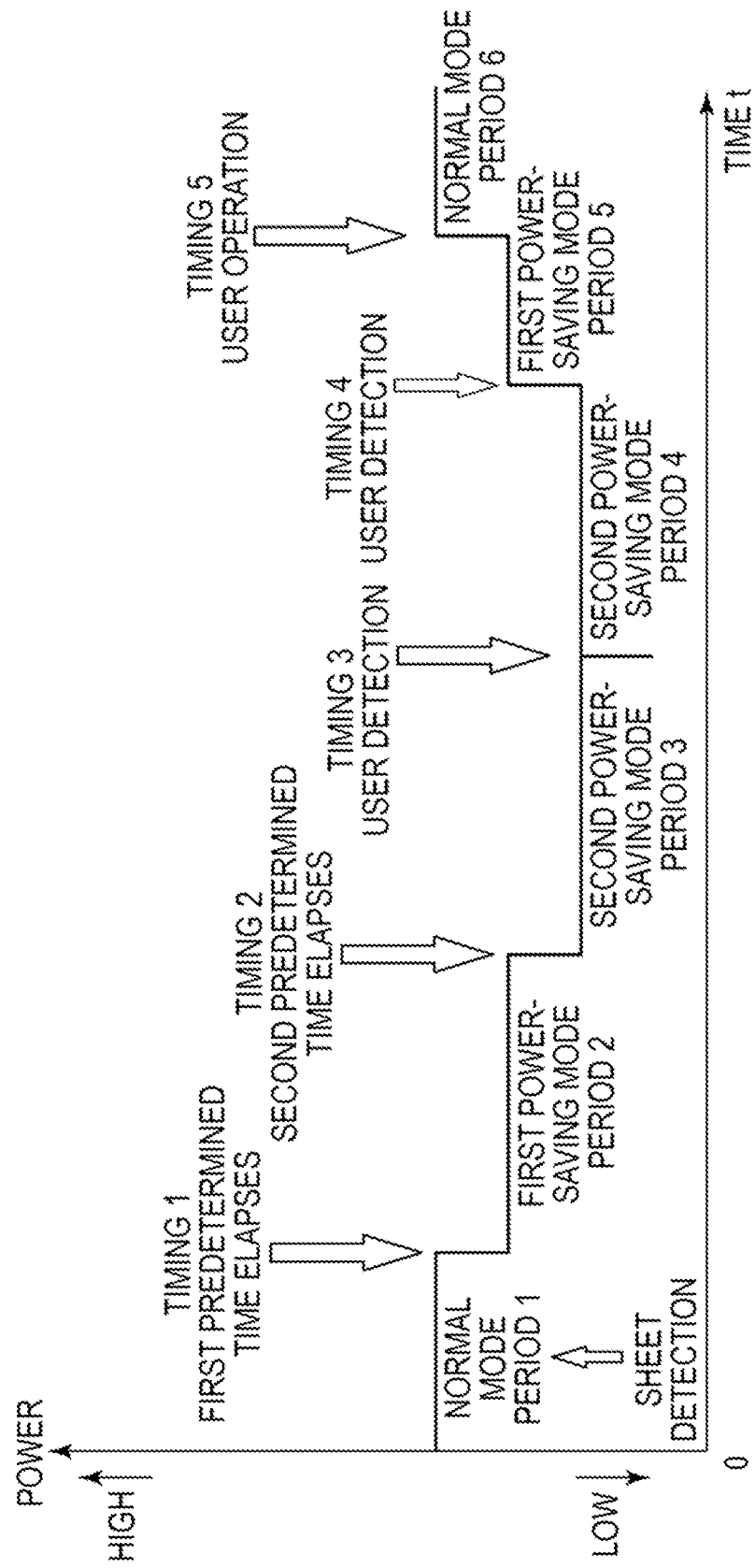
FIG. 3 is a timing chart showing a transition of an operation mode of the image forming apparatus.

FIG. 3 is a timing chart showing the transition of the operation mode of the image forming apparatus according to the embodiment.

The image forming apparatus 1 acquires a job and executes the acquired job. The job will be described by exemplifying a job related to printing based on print data transmitted from the user terminal 2 to the image forming apparatus 1 but is not limited thereto. The job may be anything related to the operation of the image forming apparatus 1. The job may be a job related to copying based on a user operation via the touch panel 22 or the input button 23. The control circuit 11 maintains the operation mode of the image forming apparatus 1 in the normal mode while executing the process based on the job (period 1). If a first predetermined time elapses after the process based on the job is completed (timing 1), the control circuit 11 shifts the operation mode of the image forming apparatus 1 from the normal mode to the first power-saving mode. The first predetermined time is a preset time starting from the end timing of the process based on the job. The end timing of the job-based process includes the timing of the transition from the printing state to the ready state based on the completion of the job-based process. If the operation mode of the image forming apparatus 1 is the normal mode (period 1), the sheet sensor 851 detects the presence or absence of the sheet in the sheet discharge unit 85. In the example shown in FIG. 3, it is assumed that the presence of a sheet in the sheet discharge unit 85 is detected by the sheet sensor 851. The control circuit 11 sets the sheet flag to "1" in the main memory 12 in response to the signal indicating the detection result from the sheet sensor 851.

The control circuit 11 maintains the operation mode of the image forming apparatus 1 in the first power-saving mode from the lapse of the first predetermined time to a second predetermined time (period 2). If the second predetermined time elapses (timing 2), the control circuit 11 shifts the operation mode of the image forming apparatus 1 from the first power-saving mode to the second power-saving mode. The second predetermined time is a preset time starting from the timing when the first predetermined time elapses. The timing when the first predetermined time elapses includes the timing at which the operation mode of the image forming apparatus 1 transitions from the normal mode to the first power-saving mode. The second predetermined time may be the same length as the first predetermined time or may be a different length of time. The first predetermined time and the second predetermined time are not limited to the preset times and may be appropriately set by the administrator of the image forming apparatus 1 or the like. The control circuit 11 maintains the operation mode of the image forming apparatus 1 in the second power-saving mode (period 3).

At timing 2, the control circuit 11 may change the detection level of the motion sensor 50. For example, the control circuit 11 may lower the detection level regarding the detection distance of the motion sensor 50 in the second power-saving mode than in the normal mode or the first power-saving mode. The sensor control circuit 60 may lower the detection level regarding the detection distance of the motion sensor 50 and shorten the detection distance under the control of the control circuit 11. The detection distance is the distance from the motion sensor 50 that the motion sensor 50 can detect a user. According to this example, the motion sensor 50 can detect a user who came to the image forming apparatus 1 to pick up the sheet or a user who came to operate the image forming apparatus 1. The motion sensor 50 can prevent the detection of a user passing near the image forming apparatus 1. As a result, it is possible to prevent unnecessary switching of the operation mode of the image forming apparatus 1 based on the user detection by the motion sensor 50 and to reduce an increase in power consumption due to the switching of the operation mode.

If the operation mode of the image forming apparatus 1 is the second power-saving mode (period 3), the control circuit 11 responds that a user is detected by the motion sensor 50 (timing 3) and refers to the sheet flag. In this example, the control circuit 11 maintains the operation mode of the image forming apparatus 1 in the second power-saving mode based on the fact that "1" is set in the sheet flag. The control circuit 11 resets the sheet flag to "0".

In a state where the operation mode of the image forming apparatus 1 is maintained in the second power-saving mode (period 4), the control circuit 11 responds that a user is detected by the motion sensor 50 (timing 4), and refers to the sheet flag. In this example, the sheet flag is reset to "0" by the control circuit 11. The control circuit 11 shifts the operation mode of the image forming apparatus 1 from the second power-saving mode to the first power-saving mode based on the fact that "0" is set in the sheet flag. The control circuit 11 maintains the operation mode of the image forming apparatus 1 in the first power-saving mode (period 5).

In the period 5, the control circuit 11 shifts the operation mode of the image forming apparatus 1 from the first power-saving mode to the normal mode based on the user operation (timing 5) via the touch panel 22 or the input button 23. The control circuit 11 maintains the operation mode of the image forming apparatus 1 in the normal mode (period 6).

[Control Operation]

Figure 4:
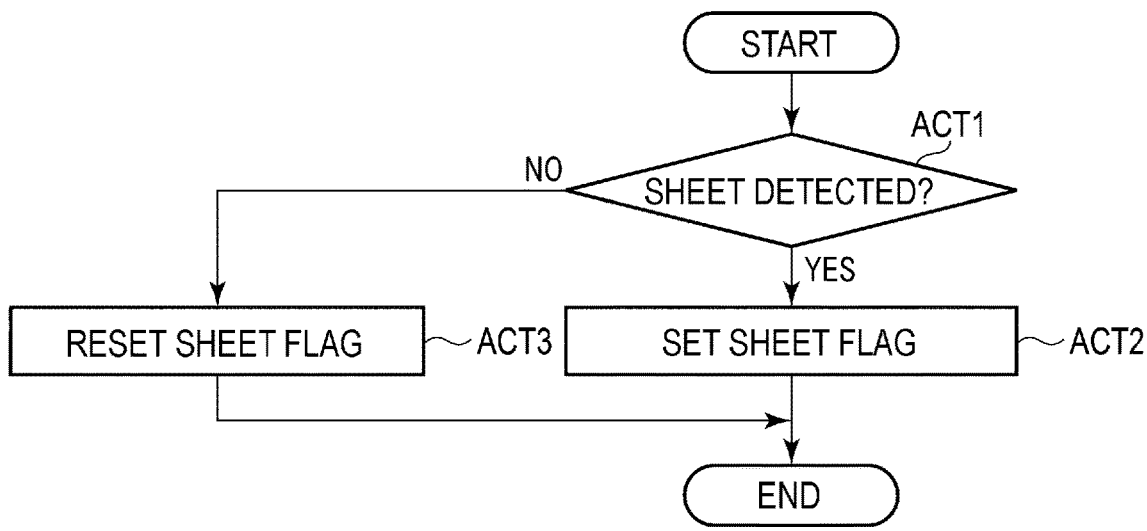
FIG. 4 is a flowchart illustrating a processing procedure of a sheet flag setting operation based on sheet detection in the image forming apparatus.

FIG. 4 is a flowchart illustrating a processing procedure of a sheet flag setting operation based on the sheet detection in the image forming apparatus 1 according to the embodiment.

The processing procedure described below is only an example and each process may be changed as much as possible. As the processing procedure, each process can be omitted or replaced according to the embodiment and a new process can be added.

In the following processing, it is premised that the operation mode of the image forming apparatus 1 is the normal mode. The sheet sensor 851 detects the sheet in the sheet discharge unit 85 before the operation mode of the image forming apparatus 1 shifts from the normal mode to the first power-saving mode.

The control circuit 11 determines whether or not the sheet is detected in the sheet discharge unit 85 by the sheet sensor 851 (ACT 1). In ACT 1, for example, the control circuit 11 determines the presence or absence of the sheet in the sheet discharge unit 85 based on the detection signal from the sheet sensor 851. If the control circuit 11 determines that the sheet was detected by the sheet sensor 851 (ACT 1: YES), the process transitions from ACT 1 to ACT 2. If the control circuit 11 determines that the sheet is not detected by the sheet sensor 851 (ACT 1: NO), the process transitions from ACT 1 to ACT 3.

The control circuit 11 sets or resets the sheet flag in the main memory 12 based on the detection signal by the sheet sensor 851 (ACT 2/ACT 3). In ACT 2, for example, the control circuit 11 sets the sheet flag to "1" based on the detection signal by the sheet sensor 851 indicating the presence of the sheet. In ACT 3, for example, the control circuit 11 resets the sheet flag to "0" based on the detection signal by the sheet sensor 851 indicating the absence of the sheet.

Figure 5:
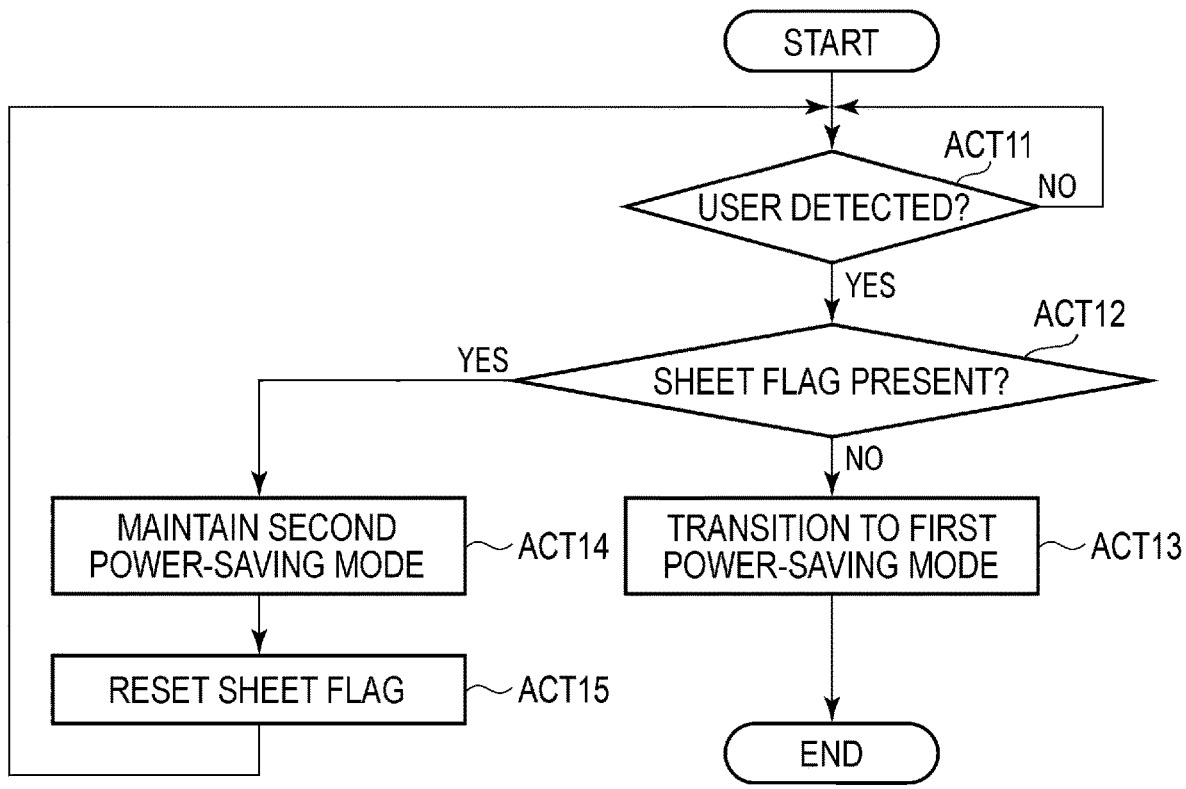
FIG. 5 is a flowchart illustrating a processing procedure of an operation for controlling the transition mode of the operation mode in the image forming apparatus.

FIG. 5 is a flowchart illustrating the processing procedure of the operation of controlling the transition mode of the operation mode in the image forming apparatus 1 according to the embodiment.

The processing procedure described below is only an example, and each process may be changed as much as possible. As the processing procedure, each process can be omitted or replaced according to the embodiment and a new process can be added.

In the following processing, it is premised that the operation mode of the image forming apparatus 1 is the second power-saving mode. The control circuit 11 shifts the operation mode of the image forming apparatus 1 from the first power-saving mode to the second power-saving mode based on the lapse of the second predetermined time shown in FIG. 3.

The control circuit 11 determines whether or not a user was detected by the motion sensor 50 (ACT 11). In ACT 11, for example, the control circuit 11 determines the detection or non-detection of a user based on the detection signal from the motion sensor 50. If the control circuit 11 determines that a user was detected by the motion sensor 50 (ACT 11: YES), the process transitions from ACT 11 to ACT 12. If the control circuit 11 determines that a user was not detected by the motion sensor 50 (ACT 11: NO), the control circuit 11 repeats the process of ACT 11.

The control circuit 11 determines whether or not the sheet flag is set to "1" in the main memory 12 (ACT 12). If the control circuit 11 determines that the sheet flag is set to "1" (ACT 12: YES), the process transitions from ACT 12 to ACT 14. If the control circuit 11 determines that the sheet flag is not set to "1" (ACT 12: NO), the process transitions from ACT 12 to ACT 13.

The control circuit 11 shifts the operation mode of the image forming apparatus 1 from the second power-saving mode to the first power-saving mode based on the fact that the sheet flag is not set to "1" (ACT 13). The fact that the sheet flag is not set to "1" is an example of the detection result indicating the absence of a sheet.

The control circuit 11 maintains the operation mode of the image forming apparatus 1 in the second power-saving mode based on the sheet flag being set to "1" (ACT 14).

The control circuit 11 resets the sheet flag to "0" in the main memory 12 (ACT 15). The control circuit 11 resets the sheet flag to "0" and then returns to the process of ACT 11. In this case, the control circuit 11 shifts the operation mode of the image forming apparatus 1 from the second power-saving mode to the first power-saving mode in response to the detection of a user by the motion sensor 50 in ACT 11. For example, the control circuit 11 determines the detection or non-detection of a user based on the detection signal from the motion sensor 50. If the control circuit 11 determines that a user was detected by the motion sensor 50 (ACT 11: YES), the control circuit 11 determines whether or not the sheet flag is set to "1" in ACT 12. In this example, the sheet flag is reset to "0". The control circuit 11 determines that the sheet flag is set to "0" (ACT 12: NO) and the process transitions from ACT 12 to ACT 13. The control circuit 11 shifts the operation mode of the image forming apparatus 1 from the second power-saving mode to the first power-saving mode based on the fact that the sheet flag is not set to "1" in ACT 13.

The control circuit 11 may process as follows based on the fact that the detection result detected by the sheet sensor 851 before the transition to the first power-saving mode indicates the presence of a sheet if the operation mode is the second power-saving mode. The control circuit 11 may maintain the operation mode in the second power-saving mode until the number of users detected by the motion sensor 50 during the second power-saving mode matches a predetermined number of users. If the operation mode is maintained in the second power-saving mode, the control circuit 11 may shift the operation mode from the second power-saving mode to the first power-saving mode in response to the number of users detected by the motion sensor 50 exceeding a predetermined number. In this example, the control circuit 11 may reset the sheet flag to "0" in ACT 15 based on the number of users detected by the motion sensor 50 in the second power-saving mode. For example, the control circuit 11 may reset the sheet flag to "0" in response to the detection of a predetermined number of users by the motion sensor 50. The predetermined number of persons is, for example, one person, two persons, or the like. The predetermined number of persons may be set in advance or may be appropriately set or updated by the administrator of the image forming apparatus 1 or the like. In this case, the control circuit 11 determines whether or not the number of users detected by the motion sensor 50 matches the predetermined number of persons in ACT 14. If the control circuit 11 determines that the number of users detected by the motion sensor 50 matches the predetermined number of persons, the control circuit 11 resets the sheet flag to "0". If the control circuit 11 determines that the number of users detected by the motion sensor 50 does not match the predetermined number of persons, the control circuit 11 maintains the sheet flag at "1" and returns to the process of ACT 11. The control circuit 11 repeats the processes of ACT 11, ACT 12, ACT 14, and ACT 15 until the number of users detected by the motion sensor 50 matches a predetermined number of persons. The predetermined number of persons can be appropriately set depending on whether the installation location of the image forming apparatus 1 is a place where many people pass or a place where almost no people pass. The image forming apparatus 1 can shift from the first power-saving mode to the second power-saving mode at an appropriate timing regardless of the installation location of the image forming apparatus 1.

If the operation mode is the second power-saving mode, the control circuit 11 may process as follows based on the fact that the detection result detected by the sheet sensor 851 before the transition to the first power-saving mode indicates the presence of the sheet. The control circuit 11 maintains the operation mode in the second power-saving mode from the time when transitioned to the second power-saving mode until a third predetermined time elapses, regardless of whether or not a user is detected by the motion sensor 50. The control circuit 11 shifts the operation mode from the second power-saving mode to the first power-saving mode in response to the detection of a user by the motion sensor 50 after the lapse of the third predetermined time. In this example, the control circuit 11 may reset the sheet flag to "0" in ACT 14 based on the elapsed time from the transition to the second power-saving mode. For example, the control circuit 11 may reset the sheet flag to "0" in response to the lapse of the third predetermined time after the transition to the second power-saving mode. The third predetermined time is a preset time starting from the timing when the second predetermined time elapses. The third predetermined time may be the same length as the first predetermined time or the second predetermined time or may be a different length of time. The third predetermined time is not limited to the preset time and may be appropriately set by the administrator of the image forming apparatus 1 or the like. In this case, the control circuit 11 determines whether or not the third predetermined time elapsed. If the control circuit 11 determines that the third predetermined time elapsed, the control circuit 11 resets the sheet flag to "0". If the control circuit 11 determines that the third predetermined time did not elapse, the control circuit 11 maintains the sheet flag at "1" and returns to the process of ACT 11. The control circuit 11 repeats the processes of ACT 11, ACT 12, ACT 14, and ACT 15 until the third predetermined time elapses. According to this example, if the operation mode is maintained in the second power-saving mode, the control circuit 11 can shift the operation mode from the second power-saving mode to the first power-saving mode in response to the fact that the predetermined time elapsed. It is highly possible that the user detected after the predetermined time elapsed is not the user who came to pick up the sheet but the user who operates the image forming apparatus 1. As a result, the image forming apparatus 1 can shift the operation mode from the second power-saving mode to the first power-saving mode according to the elapsed time from the transition to the second power-saving mode. Therefore, the image forming apparatus 1 can prevent unnecessary switching of the operation mode and reduce an increase in power consumption due to the switching of the operation mode by switching the operation mode only if a predetermined time elapses. Further, since the image forming apparatus 1 can switch the operation mode if a user is detected by the motion sensor 50 after the lapse of a predetermined time and prepare for the operation of the image forming apparatus 1 by the user, the time until the restoration can be shortened.

[Effect of Image Forming Apparatus 1]

According to the present embodiment, if the operation mode of the image forming apparatus 1 is the second power-saving mode that consumes less power than the first power-saving mode, the control circuit 11 can change the transition mode of the operation mode based on the detection result of the sheet in the sheet discharge unit 85 by the sheet sensor 851 in response to the fact that the motion sensor 50 detected a user. As a result, the image forming apparatus 1 can switch the maintenance or transition of the operation mode according to the presence or absence of the sheet in the sheet discharge unit 85 even if a user is detected by the motion sensor 50. Therefore, the image forming apparatus 1 can prevent unnecessary switching of the operation mode and reduce an increase in power consumption due to the switching of the operation mode.

According to the present embodiment, if the operation mode is the second power-saving mode, the control circuit 11 can maintain the operation mode in the second power-saving mode based on the detection result by the sheet sensor 851 indicating the existence of the sheet. If the operation mode is the second power-saving mode, the control circuit 11 can shift the operation mode from the second power-saving mode to the first power-saving mode based on the detection result by the sheet sensor 851 indicating the absence of the sheet. As a result, the image forming apparatus 1 can maintain the operation mode in the second power-saving mode if the sheet is present in the sheet discharge unit 85 even if a user is detected by the motion sensor 50. The image forming apparatus 1 can shift the operation mode to the first power-saving mode if there is no sheet in the sheet discharge unit 85. Therefore, the image forming apparatus 1 can prevent unnecessary switching of the operation mode and reduce an increase in power consumption due to the switching of the operation mode by switching the operation mode only if there is no sheet in the sheet discharge unit 85. Further, since the image forming apparatus 1 can switch the operation mode if there is no sheet in the sheet discharge unit 85 and prepare for the operation of the image forming apparatus 1 by the user, the time until the restoration can be shortened.

According to the present embodiment, the sheet sensor 851 can detect the sheet in the sheet discharge unit 85 before the operation mode transitions to the first power-saving mode. Therefore, it is not necessary to supply power to the sheet sensor 851 in the first power-saving mode and the power consumption can be reduced accordingly.

According to the present embodiment, if the operation mode is maintained in the second power-saving mode, the control circuit 11 can shift the operation mode from the second power-saving mode to the first power-saving mode in response to the detection of a user by the motion sensor 50. It is highly possible that the user detected by the motion sensor 50 for the second time is not the user who came to pick up the sheet but the user who operates the image forming apparatus 1. As a result, the image forming apparatus 1 can shift the operation mode from the second power-saving mode to the first power-saving mode according to the number of times of detection of the user by the motion sensor 50. Therefore, the image forming apparatus 1 can prevent unnecessary switching of the operation mode by switching the operation mode only if the user is detected a plurality of times by the motion sensor 50, and reduce an increase in power consumption due to the switching of the operation mode. Further, since the image forming apparatus 1 can switch the operation mode if the user is detected a plurality of times by the motion sensor 50 and prepare for the operation of the image forming apparatus 1 by the user, the time until the restoration can be shortened.

The above-described embodiment has been described by exemplifying an image forming apparatus but the present disclosure is not limited thereto. The embodiment is applicable to a device having a motion sensor. The embodiment may be applied to a Point Of Sales (POS) device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
   a first sensor configured to detect a user;
   a second sensor configured to detect a sheet in a sheet holder; and
   a controller configured to change a transition mode of an operation mode based on a first detection result of the sheet in the sheet holder by the second sensor in response to the detection of the user by the first sensor when the operation mode of the image forming apparatus is a second power-saving mode that consumes less power than a first power-saving mode,
   wherein when the operation mode is maintained in the second power-saving mode, the controller is configured to shift the operation mode from the second power-saving mode to the first power-saving mode when a predetermined number of users is detected by the first sensor, the first sensor being a single sensor, wherein the controller is configured to lower a detection level of the first sensor in the second power-saving mode.

2. The apparatus according to claim 1, wherein:
when the operation mode is the second power-saving mode, the controller is configured to maintain the operation mode in the second power-saving mode based on the first detection result indicating a presence of the sheet, and
when the operation mode is the second power-saving mode, the controller is configured to shift the operation mode from the second power-saving mode to the first power-saving mode based on a second detection result indicating an absence of the sheet.

3. The apparatus according to claim 2, wherein
when the operation mode is maintained in the second power-saving mode, the controller is configured to shift the operation mode from the second power-saving mode to the first power-saving mode in response to the detection of the user by the first sensor.

4. The apparatus according to claim 1, wherein
the second sensor is configured to detect the sheet in the sheet holder before the operation mode transitions to the first power-saving mode.

5. The apparatus according to claim 1, wherein
when the operation mode is maintained in the second power-saving mode, the controller is configured to shift the operation mode from the second power-saving mode to the first power-saving mode after a predetermined time.

6. The apparatus according to claim 1, wherein
the controller is configured to shift the operation mode from a normal mode to the first power-saving mode after a predetermined time, the first power-saving mode consuming less power than the normal mode.

7. The apparatus according to claim 1, wherein
the controller is configured to shift the operation mode from the first power-saving mode to the second power-saving mode after a predetermined time.

8. The apparatus according to claim 1, wherein
the controller is configured to shift the operation mode from the first power-saving mode to a normal power mode in response to an operation by the user, the first power-saving mode consuming less power than the normal mode.

9. A control method executed by an image forming apparatus including a first sensor configured to detect a user and a second sensor configured to detect a sheet in a sheet holder, comprising:
changing a transition mode of an operation mode based on a first detection result of the sheet in the sheet holder by the second sensor in response to the detection of the user by the first sensor when the operation mode of the image forming apparatus is a second power-saving mode, which consumes less power than a first power-saving mode;
wherein when the operation mode is maintained in the second power-saving mode, shifting the operation mode from the second power-saving mode to the first power-saving mode when a predetermined number of users is detected by the first sensor, the first sensor being a single sensor; and
lowering a detection level of the first sensor in the second power-saving mode.

10. The method according to claim 9, further comprising:
maintaining the operation mode in the second power-saving mode based on the first detection result indicating a presence of the sheet, when the operation mode is the second power-saving mode; and
shifting the operation mode from the second power-saving mode to the first power-saving mode based on a second detection result indicating an absence of the sheet, when the operation mode is the second power-saving mode.

11. The method according to claim 10, further comprising
shifting the operation mode from the second power-saving mode to the first power-saving mode in response to the detection of the user by the first sensor, when the operation mode is maintained in the second power-saving mode.

12. The method according to claim 9, further comprising
detecting, via the second sensor, the sheet in the sheet holder before the operation mode transitions to the first power-saving mode.

13. The method according to claim 9, further comprising
shifting the operation mode from the second power-saving mode to the first power-saving mode after a predetermined time, when the operation mode is maintained in the second power-saving mode.

14. The method according to claim 9, further comprising
shifting the operation mode from a normal mode to the first power-saving mode after a predetermined time, the first power-saving mode consuming less power than the normal mode.

15. The method according to claim 9, further comprising
shifting the operation mode from the first power-saving mode to the second power-saving mode after a predetermined time.

16. The method according to claim 9, further comprising
shifting the operation mode from the first power-saving mode to a normal power mode in response to an operation by the user, the first power-saving mode consuming less power than the normal mode.

* * * * *